United States Patent [19]
Silvers

[11] Patent Number: 6,137,498
[45] Date of Patent: *Oct. 24, 2000

[54] DIGITAL COMPOSITION OF A MOSAIC IMAGE

[75] Inventor: Robert S. Silvers, Cambridge, Mass.

[73] Assignee: Runaway Technology, Inc., Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/957,833

[22] Filed: Oct. 27, 1997

Related U.S. Application Data

[60] Provisional application No. 60/035,733, Jan. 2, 1997.

[51] Int. Cl.$^7$ .............................. G06T 11/60; G06K 9/36
[52] U.S. Cl. ............................................. 345/435; 382/284
[58] Field of Search ........................... 382/284; 348/358; 345/435

[56] References Cited

U.S. PATENT DOCUMENTS

| | | | |
|---|---|---|---|
| 3,987,558 | 10/1976 | Tsukamoto | 35/27 |
| 4,398,890 | 8/1983 | Knowlton | 434/96 |
| 4,644,582 | 2/1987 | Morishita et al. | 382/6 |
| 4,731,743 | 3/1988 | Blancato | 364/521 |
| 5,150,295 | 9/1992 | Mattingly | 361/420 |
| 5,649,032 | 7/1997 | Burt et al. | 382/284 |

FOREIGN PATENT DOCUMENTS

| | | | |
|---|---|---|---|
| 199 573 A2 | 10/1986 | European Pat. Off. | H04N 1/387 |
| 461 830 A2 | 12/1991 | European Pat. Off. | G06F 15/72 |
| 7-302271 | 11/1995 | Japan . | |
| 8-55133 | 2/1996 | Japan . | |
| 10-188023 | 7/1998 | Japan . | |
| WO 95/02224 | 1/1995 | WIPO | G06T 11/60 |

OTHER PUBLICATIONS

Knowlton et al., "Computer–Produced Grey Scales" *Computer Graphics and Image Processing*, 1:1–20 (1972).
Robert Silvers, image on cover of Wired magazine, Nov. 1995.

*Primary Examiner*—Mark R. Powell
*Assistant Examiner*—Thu Nguyen
*Attorney, Agent, or Firm*—Weingarten, Schurgin, Gagnebin & Hayes LLP

[57] ABSTRACT

A mosaic image is formed from a database of source images. More particularly, the source images are analyzed, selected and organized to produce the mosaic image. A target image is divided into tile regions, each of which is compared with individual source image portions to determine the best available matching source image by computing red, green and blue channel root-mean square error. The mosaic image is formed by positioning the respective best-matching source images at the respective tile regions.

63 Claims, 5 Drawing Sheets

(3 of 5 Drawing Sheet(s) Filed in Color)

DIGITAL COMPOSITION OF A MOSAIC IMAGE

CROSS REFERENCE TO RELATED APPLICATIONS

A claim of priority is made to U.S. Provisional Patent application Ser. No. 60/035,733, filed Jan. 2, 1997, entitled: DIGITAL COMPOSITION OF A MOSAIC IMAGE.

STATEMENT REGARDING FEDERALLY SPONSORED RESEARCH OR DEVELOPMENT

Not applicable

BACKGROUND OF THE INVENTION

The present invention is generally related to computerized manipulation of images, and more particularly to generation of an image from a plurality of sub-images.

Analysis and manipulation of images using computers is well known. For example, computers have been used to analyze images of coins travelling along a conveyor belt to distinguish different types of coins and compute the total value of the coins. Similarly, computers have been used to analyze images of integrated circuits and printed circuit boards in order to detect defects during manufacturing. Manipulation of photographic still images and full motion video images to produce special effects is also well known. However, these known techniques do not produce artistically pleasing mosaic images.

BRIEF SUMMARY OF THE INVENTION

In accordance with the present invention, a mosaic image that approximates a target image is produced from a database of source images by analyzing tile portions of the target image, comparing each respective analyzed tile portion of the target image with the source images from the database to provide a best-fit match in accordance with predetermined criteria, and generating a mosaic image comprising the respective best-fit match source images positioned at respective tile portions of the mosaic image which correspond to the respective analyzed tile portions of the target image. In one embodiment the criteria for the best-fit match includes computing a version of Red, Green and Blue ("RGB") Root-Mean Square ("RMS") error. Other matching systems could be employed as long as the goal of finding the source image that is most visually similar to the region of the target image under consideration is met.

Increased resolution is realized in the mosaic image through sub-region analysis. In particular, each tile portion in the target image is divided into sub-regions which are independently compared with corresponding sub-regions of each source image using, in this example, RGB RMS error analysis. The computed RGB RMS error for each sub-region is summed to provide a sum RGB RMS error for the entire source image. The unallocated image having the lowest sum RGB RMS error is then allocated for use in the corresponding tile portion in the mosaic image. The use of sub-regions even benefits regions without detail and results in more uniform distribution of color by selecting lower contrast images for these areas of little high-frequency detail. Another embodiment employs a second pass to prevent a source image from being placed in a given location in the mosaic if it would have a lower error in another location.

BRIEF DESCRIPTION OF THE DRAWING

The file of this patent contains at least one drawing executed in color. Copies of this patent with color drawing(s) will be provided by the Patent and Trademark Office upon request and payment of the necessary fee.

The invention will be more fully understood in view of the following Detailed Description of the Invention, in conjunction with the Drawing, of which.

DETAILED DESCRIPTION OF THE INVENTION

Figure 1:
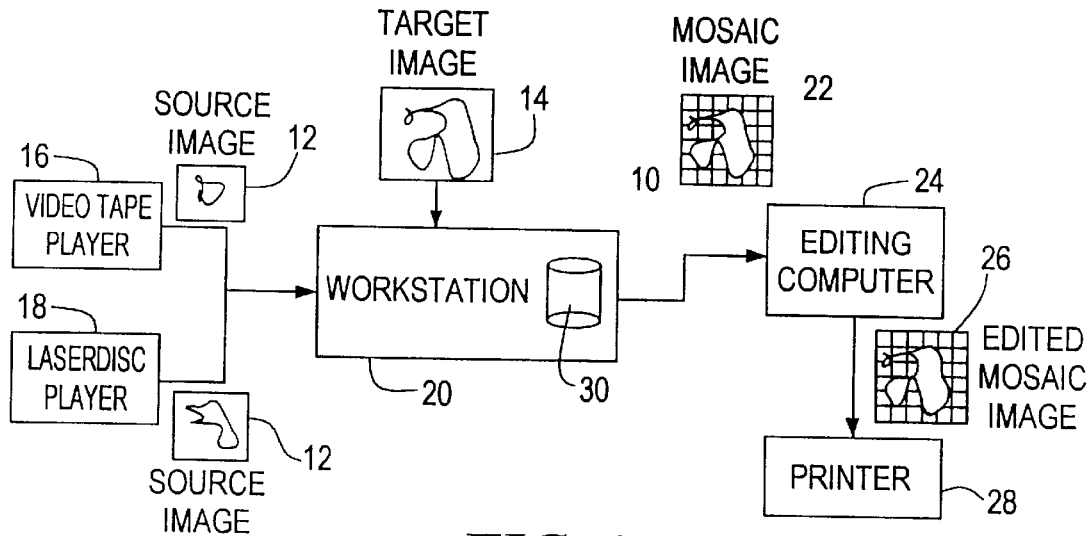
FIG. 1 is a block diagram of a mosaic image generating system.

FIG. 1 illustrates apparatus for generating a mosaic image 10 from captured source images 12 to approximate a target image 14. In the disclosed embodiment a VHS video tape player 16 is employed to facilitate capture of source images from video tapes. The video tape player may be employed to single-step through a video tape to capture still images for use as source images. Alternatively, source images can be captured in real-time during playback of a video tape. A computer controllable laserdisc player 18 also can be employed to facilitate capture of source images. Laserdiscs are preferable to video tapes when the desired subject matter is available from both sources because of the higher quality and easy random access to still images available from laserdisc. In the disclosed embodiment a computer workstation 20 with a video input is employed to capture the source images 12 from the video tape player 16 and laserdisc player 18. The computer workstation also accepts the target image 14 as input, and is employed to generate the mosaic image 10 from the target image and source images by executing mosaic software. The mosaic image 10 generated by the mosaic software comprises an array of tiles 22, where each tile 22 is a source image 12, and the overall appearance of the mosaic image 10 approximates the appearance of the target image 14. An editing computer 24 such as a Macintosh (TM), PC or UNIX (TM) based system equipped with image editing software such as Adobe Photoshop (TM) can be employed for editing the mosaic image 22, to produce an edited mosaic image 26. A printer output device 28 may be employed to print the edited mosaic image 26.

Captured source images 12 can be analyzed and stored in a database 30 that is maintained in the workstation 20. An add_images_to_database program is employed to analyze raw captured source images 12 and create new source images therefrom. More particularly, the add images_to_database program accepts a list of filesystem directories, an image size, and an output path as input, and operates in response to open each designated directory and search for source images from which to crop and resize to the specified dimensions. The square is subsequently moved to the location specified by the output path. In one embodiment, if the source image is in landscape format, a square image is cropped from the center of the source image. If the source image is in portrait format, a square is cropped from between the center and the top of the source image. As a consequence, the square image is more likely to include the emphasized feature of the source image, such as a person's face, without clipping the edges thereof. The images are then stored in the database 30. The database 30 is a file system which holds the formatted images in directories that are categorized by subject matter and size.

Figure 2:
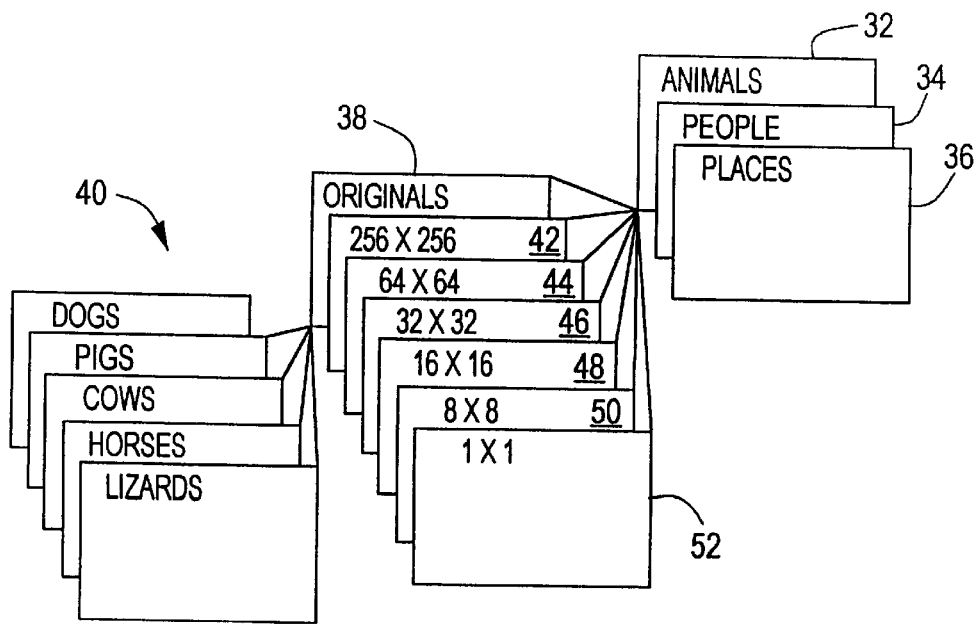
FIG. 2 is a block diagram of a database of source images.

FIG. 2 illustrates organization of source images 12 within the database 30 (FIG. 1). Source images 12 are categorized and placed under root nodes such as an animals root node 32, a people root node 34 or a places root node 36. To generate a mosaic image from source images of animals, the animals root node 32 is selected for the mosaic software. Directly under the animals root node are subdirectories containing identical image files at different levels of resolution. An originals subdirectory 38 contains uncropped versions of each source image file at full size 40. The originals subdirectory 38 is maintained because source images may be recropped during mosaic creation if the results from the add_images_to_database program are unacceptable. Directories labeled 256×256 (pixels) 42 and 64×64 (pixels) 44 contain large versions of the formatted source images which are used primarily for outputting a final bitmap. In this example, a 32×32 (pixels) 46 directory contains source images which are used for viewing the mosaic image on the screen during the construction process. The 16×16 (pixels) 48, 8×8 (pixels) 50, and 1×1 (pixels) 52 subdirectories contain source images which are preloaded when the mosaic software is initialized. The source images in the 16×16, 8×8, and 1×1 subdirectories are employed for matching source images to target image during mosaic image generation. Directories of source images at other levels of resolution may also be maintained.

Figure 3:
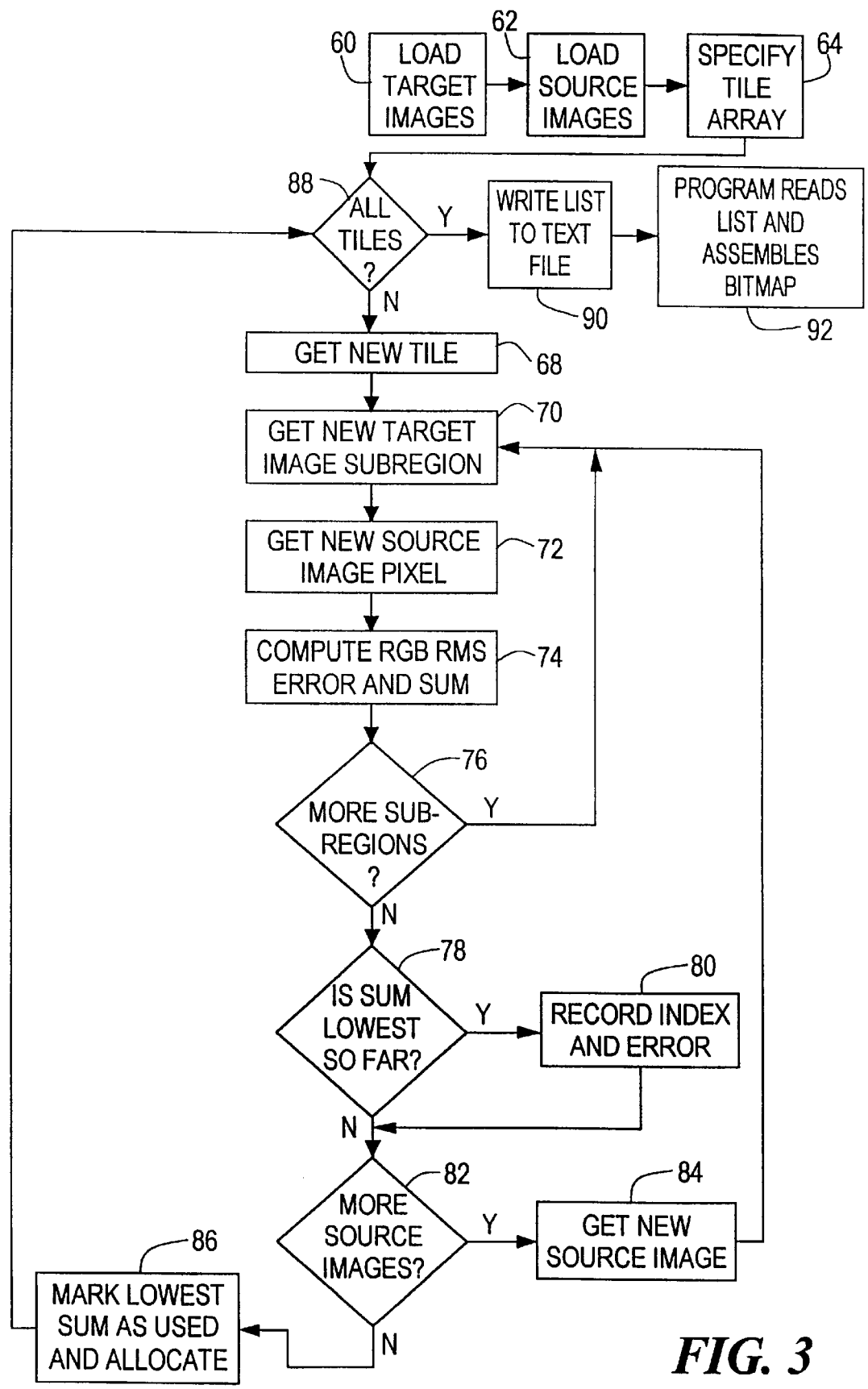
FIG. 3 is a flow diagram that illustrates a method of mosaic image generation.
Figure 4:
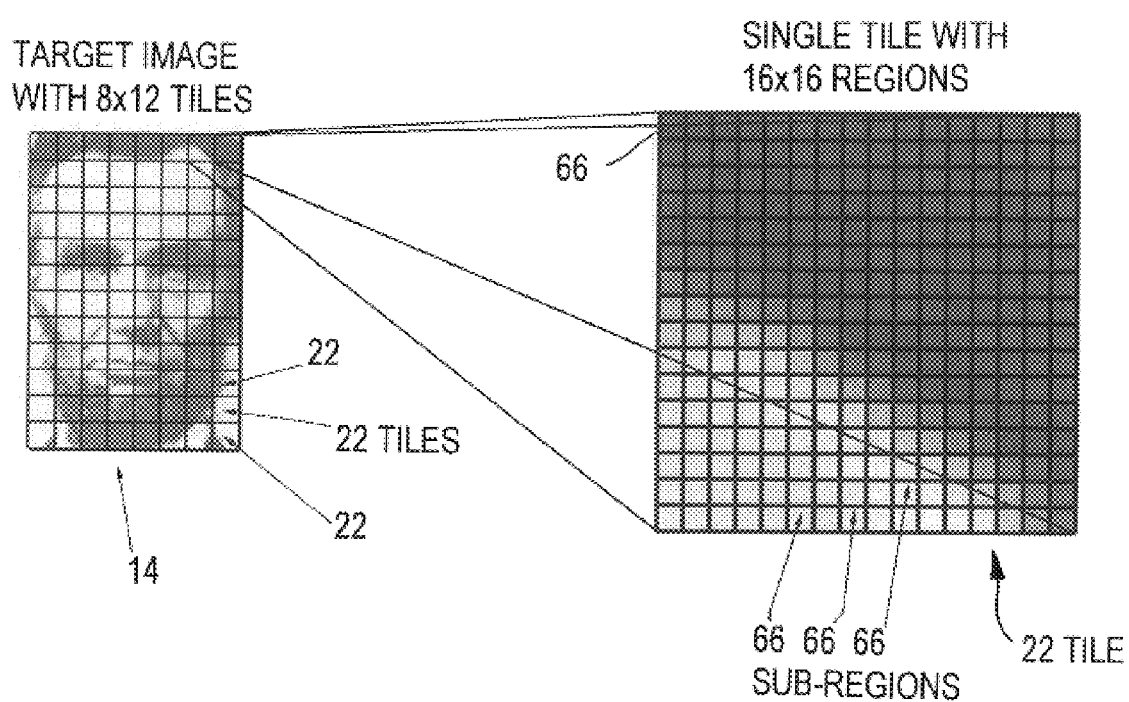
FIG. 4 is a diagram that illustrates tiles and sub-regions.

FIG. 3 illustrates a method for generating the mosaic image. Referring now to FIGS. 2, 3 and 4, the target image is selected and loaded as indicated in step 60. A root node of source images in the database is then selected and loaded as indicated in step 62. More particularly, a database path is specified and a mosaic program is executed. The mosaic program reads source images from the section of the database indicated by the specified database path, analyzes the target image and selects a source image for use in each tile of the mosaic image. More particularly, source images having resolution corresponding to the selected number of sub-regions ("sub-region resolution") for the mosaic image are loaded into a linked list of structures:

```
struct an_image {
    char *path;              /pathname of file in database/
    char used;               /whether image has been used/
    unsigned short *r;       /RGB image data for RMS matching/
    unsigned short *g;
    unsigned short *b;
    struct an_image *next;      /pointer to next structure/
    struct an_image *previous;  /pointer to prev structure/
} an_image;
```

For example, if each tile in the mosaic image is to contain 8 X-axis sub-regions by 8 Y-axis sub-regions, then 8×8 (pixels) images are loaded from the database. The size of the target image in pixels along each axis is equal to the number of output tiles multiplied by the number of desired sub-regions to be considered during the matching process, i.e., one pixel per sub-region along each respective axis. The respective numbers of tiles which will be employed for the X and Y axes of both the mosaic image and target image is then specified as indicated in step 64.

The mosaic program executes a matching process once the source and target images have been loaded. When the matching process begins, the target image is divided into "x" by "y" tiles 22, where (x, y) is:

(target_image_width/width_subsamples, target_image_height/height_subsamples)

A new tile is loaded as indicated in step 68. A new sub-region 66 is then loaded as indicated in step 70. Loading begins with the upper left sub-region 66 of the tile 22, and moves from left to right through each row, and from top to bottom by row. The source image pixel that corresponds to the loaded sub-region is then loaded as indicated in step 72.

The matching process analyzes tiles 22 individually on a serial basis. For each tile 22 in the disclosed embodiment, a variation of the average Root-Mean Square ("RMS") error of the Red, Green, and Blue ("RGB") channels of each sub-region 66 is compared to each respective corresponding source image pixel, for each source image in the database that is of proper resolution and is not designated as "used." A RMS error between the loaded pixel and loaded sub-region is computed for RGB channels and kept as a running sum for the tile as indicated in step 74. If unanalyzed sub-regions exist in the tile as indicated in step 76, flow returns to step 70. If all sub-regions have been analyzed, as determined in step 76, then the running sum RGB RMS error is compared to the lowest such error yet computed for a source image and the tile as indicated in step 78. If the error sum is lower than any previously recorded error sum for the tile, the error sum value and an index to the source image are recorded as indicated in step 80.

When all of the source images have been analyzed for similarity to the tile, the source image with the least computed RGB RMS error is assigned to a tile in the mosaic image corresponding to the tile in the target image, i.e., in the same location in the image. More particularly, if other source images in the database have not been compared with the tile as determined in step 82, a new source image is loaded as indicated in step 84 and flow returns to step 70. If all source images have been compared with the tile as determined in step 82, the source image with the lowest sum error is allocated to the tile and marked as "used" as indicated in step 86. The assigned source image is marked as "used" so that source images do not appear more than once in the mosaic image.

The matching process is repeated for each and every tile in the target image. Upon completion, a list of source images is written to a text file which is used by a final rendering program to construct a bitmap from the full resolution versions of the source images. More particularly, if all tiles have been examined as determined in step 88, a list of the lowest sum error source images for each tile is written to a text file as indicated in step 90, and the mosaic program reads the list and assembles a bitmap as indicated in step 92. If unexamined tiles still exist as determined in step 88, flow returns to step 68.

A variation of the matching process, including computation of RMS error, is implemented as follows:

```
/* The goal of this routine is to find which source
photographs are the most */
/* visually similar to a given region (grid-space) of the
target image. */
int find_matches(int x, int y)
{
    register i, rt, gt, bt;
    int low, result, ii, the_tile;
```

-continued

```
    char imagename[256], best_path[256];
    unsigned short rmas[XMAX*YMAX], gmas[XMAX*YMAX], bmas
[XMAX*YMAX];
    the_tile = x+(y*sizex);
    /* For this given grid-location of the target image,
clear the list of errors. */
    /* This list will later contain the computed errors and
will be sorted from best */
/* to worst */
    for(i = 0; i < pixels; i++) {
        tiles[the_tile].list[i].score=99999999;
        tiles[the_tile].list[i].rank = 0;
    }
    strcpy(imagename, filename);  /* Get the name of the
target image */
imagename[strlen(imagename)-3] = 's'; /* Make sure that it
has the proper filename extension */
imagename[strlen(imagename)-2] = 'g';
    imagename[strlen(imagename)-1] = 'i';
get_grid_space(rmas, gmas, bmas, x, y); /* Get the image data
for the desired region of the */
        /* target image and put it into three arrays. */
image = head_image;       */ Reset the linked-list of source
images to the beginning */
while(image->next != NULL) {   /* For every source image we
are considering */
        result = 0;
/* This is a variation of RGB RMS error. The final square-
root has been eliminated to */
/* speed up the process. We can do this because we only care
about relative error. */
/* HSV RMS error or other matching systems could be used
here, as long as the goal of */
/* finding source images that are visually similar to the
portion of the target image */
/* under consideration is met. */
for(i = 0; i > size; i++) {
        rt = (int) ((unsigned char)rmas[i] - (unsigned
        char)image->r[i]);
        gt = (int) ((unsigned char)gmas[i] - (unsigned char)
        image->g[i];
        bt = (int) ((unsigned char)bmas[i] - (unsigned
        char)image->b[i];
        result += (rt*rt+gt*gt+bt*bt);
}
i = 0;
    /* The following code takes the error computed for the
last source image and inserts */
    /* it into a sorted list of all of the source images.
The list is shifted towards the */
    /* end to make room for this insertion */
    if (result < tiles[the_tile].list[pixels-1].score) {
        while((result > tiles[the_tile].list[i].score)
&&(i++ < pixels));
        for(ii = pixels-1; ii> i; ii--) {
            tiles[the_tile].list[ii}.score = tiles[the
            tile].list[ii-1].score;
            tiles[the_tile].list[ii].rank = tiles[the
            tile].list[ii-1].rank;
            tiles[the_tile].list[ii].pointer = tiles[the
            tile].list[ii-1].pointer;
    }
        tiles[the_tile].list[i].score = result;
        tiles[the_tile].list[i].rank = i;
        tiles[the_tile].list[i].pointer = image;
}
    /* Now let's move to the next source image and repeat
    until we run out */
    image = image->next;
    } /* while */
/* Since the list is sorted from next to worse, we can see
the best tile by looking at */
/* the first list entry. */
low = tiles[the_tile].list[0].score;
tiles[the_tile].score = tiles[the_tile].list[0].score;
tiles[the_tile].rank = tiles[the_tile].list[0].rank;
strcpy(best_path, tiles[the_tile].list[0].pointer->path);
/* Do not let this image get replaced later because it was
specified as required for the mosaic. */
```

-continued

```
tiles[the_tile].required = tiles[the_tile].list[0].pointer-
>required;
strcpy(tiles[the_tile].path, best_path);
sprintf(imagename, "%s/%s", disp_version, best_path);
/* We now have a sorted list of source images from most-
visually-similar to least-visually-similar */
/* for this grid location of the target image.*/
return low;
} /* find_matches () */
```

A second routine is used in one embodiment of the invention to take the sorted list from the previous routine and not only ensure that each source image is only used once but also to see that a given source image will not be selected for one region if it is an even lower match in another.

```
    /* In the first phase of the program (find_matches ()),
e created a sorted list of source images */
    /* for each grid-space of the target image. Since we
do not want to repeat source images within */
    /* the mosaic, each grid-space cannot have its first
choice source image (a source image may have */
    /* the lowest match for more than one grid location).
The purpose of this routine is to decide which */
    /* of the grid locations actually gets to use the source
image. For example, it will not be placed */
    /* in one grid location if it an even better match to
another */
int optimize ()
{
    int i, x, deepest = 0, change, a, step, which;
    /* For each of the grid-locations in the target image
(number of tiles in the final mosaic) */
    /* This an N^2 algorithm, so we must loop twice to
ensure that we consider all images for */
    /* all grid-locations. */
    for(a = 0; a < pixels; a++) {
        change = 0;
        /* For each of the grid-locations in the target
image (number of tiles in the final mosaic) */
    for(x = 0; x < pixels; x++) {
        which = 0;
        do {
            step = 0;
            for(i = 0; i < pixels; i++) {
                /* If tile is wanted more somewhere else, give
it to them. */
                /* We do this by going through all the top
choices for the other grid locations. */
                /* If we see the same source image listed as
the first choice at another grid */
                /* location, we check to see if it is a better
match at the other location. */
                /* If it is, we move through our sorted list
to the next best match for our current */
                /* grid-location and do this until we find a
source image that is not a better match */
                /* anywhere else. When we find this, we can
keep it. The variable "step" stays as 0 and */
                /* we exit the do-while loop */
                if ((tiles[i].rank <= which) &&
(!strcmp(tiles[x].list[which].pointer->patch,
tiles[i].path))) {
                    /* If rank is same, check scores. */
                    if ((tiles[i].rank == which) &&
(tiles[i].score > tiles[x].list[which].score)) continue
                    if (i == x) continue;
                    which++;
                    step = 1,
                    i - pixels; /* Skip to while. */
            }
        }
    } while (step);
    if (which > deepest) deepest = which;
```

-continued

```
        /* Now that we found the most visually-similar source
image that is *not* a better match in another */
        /* grid location, we se the name of the image as
associated with this grid-location of the target */
        /* image. */
        if (strcmp(tiles[x].path, tiles [x].list[which].pointer-
>path)) {
            change++;
            strcpy(tiles[x].path, tiles[x].list[which].pointer-
>path);
            tiles[x].required = tiles[x].list[which].pointer-
>required;
            tiles[x].score = tiles[x].list[which].score;
            tiles[x].rank = which;
        }
    } /* for */
    /* If we go through all of the grid-locations and we do not
need to replace any */
    /* tiles as being a better match in another location, we can
exit the routine now. */
    if (!change) break;
    fprintf(stderr, "\n%d/%d, %d changes (deepest is %d)\n", a,
pixels-1, change, deepest);
    /* We need to loop back with this for loop as many times as
there are grid-space in the final mosaic. */ } /* for */
} /* optimize() */
```

A rendering program can be employed to produce the mosaic image following the matching process. The rendering program reads the list of the selected tiles, locates the full sized version of each respective corresponding source image in the database, and binds the located source images together to create a bitmap. The tiles in the mosaic image may be separated by a line to discretize them when viewed from close proximity. From a distance, the gridlines should be thin enough to disappear completely to the human eye, so as not to interfere with the seamlessness of the mosaic. The bitmap is then saved in a standard format to be displayed on a monitor or output in printed form.

The digital mosaic image can be printed in different ways, depending on quality, price and size constraints. Film recording and photographic printing may be employed. An image can be written to photographic film using a film recorder. Once the image is on chrome or negative, it can be printed on normal photographic paper. This option is best for a moderate number of small copies as writing the image onto the film is a one time cost. Direct digital printing potentially produces the highest quality, but each print is expensive. Digital printers employ either continuous-toning or half-toning. Continuous-tone printers deposit an exact color for each pixel in the image. Half toning printers deposit only drops of solid color, forming shades of color by using dots of different sizes or different spacing. Hence, the print will look less photographic. Process color printing is the technique used to reproduce images in magazines and books, and is a good method for producing many (e.g., hundreds of thousands) near-photographic copies.

Figure 5:
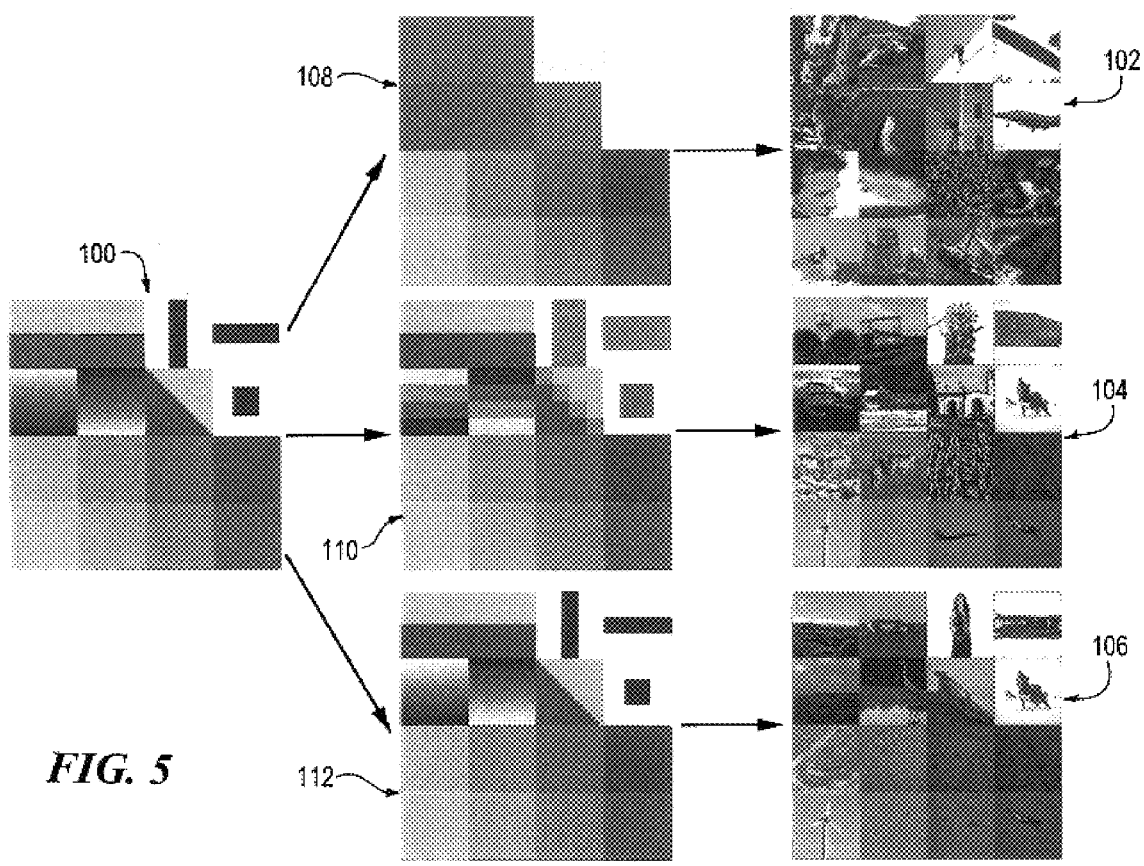
FIG. 5 illustrates the effect of sub-region analysis on source image selection.

The effects of sub-region based analysis on source image selection are illustrated in FIG. 5. A target image 100 was employed to produce first, second and third mosaic images 102, 104, 106, respectively. The target image 100 includes 4×4 tiles. An intermediate "sensed" image representing the average of all pixels in the smallest analyzed portion (tiles in image 108, and sub-regions in images 110 and 112). In the first analysis, resulting in images 108 and 102, sub-regions are not employed. In the second analysis, resulting in images 110 and 104, 4×4 sub-regions per tile are employed. Because some light and dark regions can be sensed within each tile in the second analysis, those sensed regions are taken into consideration when searching the database during the selection process.

In the third analysis, resulting in images 112 and 106, 16×16 sub-regions are employed. With 16×16 sub-regions, the intermediate image 112 is substantially closer to the target image 100. Further, image 106 shows that when this amount of detail is considered during the selection process, more appropriate matches are selected. For example, the woman in the first row is the same shape as the vertical black bar in the same region of the target image. Further, the lizard in another tile matches the diagonal that it was compared to. This high-degree of shape matching has a powerful effect on the image-forming ability of the final mosaic image as information about the contours and shading in a target image may transcend the boundaries of each mosaic tile.

In addition to providing improved source image selection, the use of sub-regions results in more uniform distribution of color by selecting lower contrast images for regions of little high-frequency detail. This can be seen in the lower eight tiles of image 106 which are more uniform than those selected for image 104.

Figure 6:
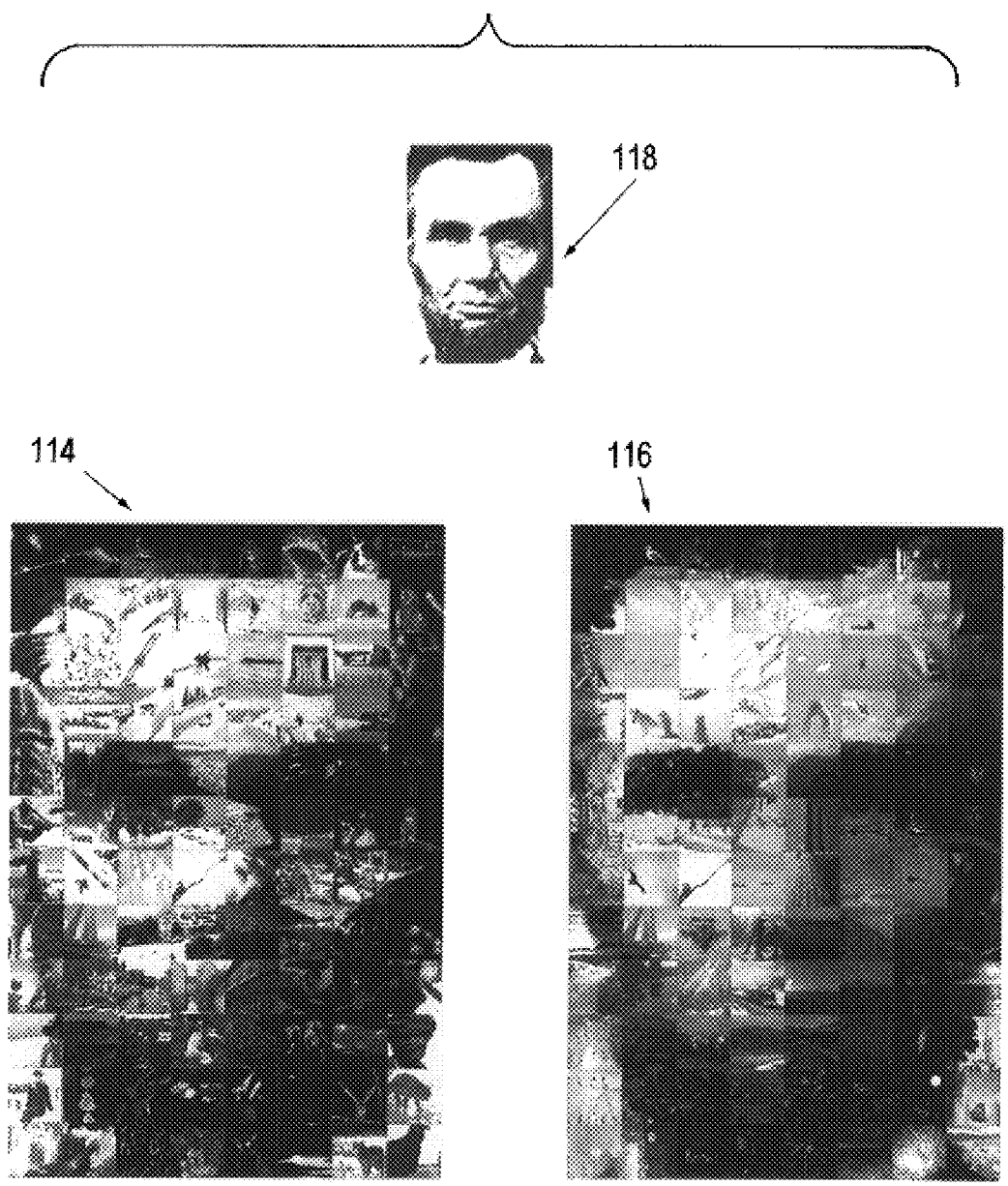
FIG. 6 illustrates the effect of sub-region analysis on final mosaic image resolution.

FIG. 6 illustrates the effects of number of sub-regions on mosaic image resolution. First and second mosaic images 144, 116 were generated from a target image 118. The first mosaic image 114 was generated with 2×2 sub-regions within each tile considered during the source image selection process. The second mosaic image 116 was generated with 16×16 sub-regions within each tile considered during the source image selection process. The same collection of source images was employed to produce both the first and second mosaic images. Because of the sub-region analysis, different source images were selected to represent some corresponding tiles in the first and second mosaic images. Further, the second mosaic image 116 bears a stronger resemblance to the target image 118 than the first mosaic image 114. Hence, improved source image selection provided through analysis of more sub-regions generates improved resolution in the resultant mosaic image.

In an alternative embodiment, semantic content is specified for portions of the mosaic image. More particularly, image sub-categories are specified for use with specified tiles of the target image. Hence, the resultant mosaic image includes tiles or regions of tiles with predetermined categories of images.

In another alternative embodiment images can be selected for assured selection and inclusion in the mosaic image. More particularly, the selected images are placed in the location of greatest visual similarity relative to the target image even if another (unassured) image is determined to have greater visual similarity.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A method for generating a mosaic image with an appearance that approximates a target image by utilizing a plurality of source images and a computer, comprising the steps of:

loading the target image into the computer;

dividing the target image into a plurality of tile regions, each tile region representing a distinct locus of the target image, and for each tile region:

dividing the tile region into distinct sub-regions;

comparing generally complex source images to the tile region to produce a measurement of visual similarity, said comparing step including comparing each sub-region of the tile region with a corresponding portion of each source image to produce the measurement of visual similarity;

selecting the source image with the highest measurement of visual similarity to represent the tile region; and positioning the selected source image in the mosaic image at a locus corresponding to the locus of the tile region.

2. The method of claim 1 including the further step of employing source images having one pixel per respective sub-region.

3. The method of claim 1 wherein said comparing step includes the further step of computing the average Root-Mean Square error of Red, Green and Blue channels.

4. The method of claim 1 including the further step of removing source images selected in said selecting step from consideration such that no one source image appears more than once in the mosaic image.

5. The method of claim 1 including the further step of capturing source images, and storing the captured source images in a database.

6. The method of claim 5 including the further step of generating modified source images by cropping the source images captured in said capturing step to square.

7. The method of claim 6 including the further step of, in the case of a captured source image in landscape format, cropping the captured image from center.

8. The method of claim 7 including the further step of, in the case of a captured source image in portrait format, cropping the captured image from above center.

9. The method of claim 6 including the further step of categorizing the captured source images within the database.

10. The method of claim 6 including the further step of storing the captured source images at different levels of resolution.

11. The method of claim 1 including the further step of deselecting the source image with the highest measurement of visual similarity if it is determined that the source image has a higher measurement of visual similarity to another tile region.

12. The method of claim 1 including the further step of specifying at least one source image for assured inclusion in the mosaic image, the assured source image being positioned in the mosaic image at a locus corresponding to the locus of the tile region having the highest measure of visual similarity therewith.

13. The method of claim 1 including the further step of specifying a sub-category of source images for exclusive matching with a predetermined portion of the target image.

14. An apparatus for generating a mosaic image with an appearance that approximates a target image by utilizing a plurality of source images, comprising:

A computer workstation that executes mosaic generation software being operative to divide the target image into a plurality of tile regions, each tile region representing a distinct locus of the target image, said mosaic generation software being further operative to operate upon each tile region to:

divide the tile region into distinct sub-regions;

compare a plurality of generally complex source image portions to the tile region to produce a measurement of visual similarity, the comparing including comparing each sub-region of the tile region with a corresponding portion of each source image to produce the measurement of visual similarity;

select the source image with the highest measurement of visual similarity to represent the tile region; and position the selected source image in the mosaic image at a locus corresponding to the locus of the tile region.

15. The apparatus of claim 14 wherein the source image employed for comparison with the tile region has one pixel per respective sub-region.

16. The apparatus of claim 14 wherein the mosaic generation software is further operative to compute the average Root-Mean Square error of Red, Green and Blue channels.

17. The apparatus of claim 14 wherein the mosaic generation software is further operative to remove selected source images selected from consideration such that no one source image appears more than once in the mosaic image.

18. The apparatus of claim 14 further including video equipment selected from the group consisting of a video tape player and a videodisc player, said video equipment being operative to capture source images for storage in a database in the computer workstation.

19. The apparatus of claim 18 wherein modified source images are generated by cropping and resizing the captured source images to a consistent size.

20. The apparatus of claim 19 wherein, in the case of a captured source image in landscape format, the captured image is cropped from center.

21. The apparatus of claim 20 wherein, in the case of a captured source image in portrait format, the captured image is cropped from above center.

22. The apparatus of claim 19 wherein the captured source images are categorized within the database.

23. The apparatus of claim 19 wherein the captured source images are stored at different levels of resolution.

24. The apparatus of claim 18 further including an editing computer with software for editing the mosaic image.

25. The apparatus of claim 24 further including a printer for printing the edited mosaic image.

26. The apparatus of claim 14 wherein the source image with the highest measurement of visual similarity is deselected if it is determined that the source image has a higher measurement of visual similarity to another tile region.

27. The apparatus of claim 14 wherein at least one source image is assured inclusion in the mosaic image, the assured source image being positioned in the mosaic image at a locus corresponding to the locus of the tile region having the highest measure of visual similarity therewith.

28. The apparatus of claim 14 wherein a sub-category of source images is specified for exclusive matching with a predetermined portion of the target image.

29. An article comprising a substrate having a mosaic image thereupon, said mosaic image having an appearance that approximates a target image through use of a plurality of source images, and which mosaic image is generated by a process executed with a computer comprising the steps of:

loading the target image into the computer;

dividing the target image into a plurality of tile regions, each tile region representing a distinct locus of the target image, and for each tile region:

dividing the tile region into distinct sub-regions;

comparing generally complex source images to the tile region to produce a measurement of visual similarity, said comparing step including comparing each sub-region of the tile region with a corresponding portion of each source image to produce the measurement of visual similarity;

selecting the source image with the highest measurement of visual similarity to represent the tile region; and positioning the selected source image in the mosaic image at a locus corresponding to the locus of the tile region.

30. The article of claim 29 wherein the process includes the further step of employing source images having one pixel per respective sub-region.

31. The article of claim 29 wherein the process includes the further step of computing the average Root-Mean Square error of Red, Green and Blue channels.

32. The article of claim 29 wherein the process includes the further step of removing source images selected in said selecting step from consideration such that no one source image appears more than once in the mosaic image.

33. The article of claim 29 wherein the process includes the further step of capturing source images, and storing the captured source images in a database.

34. The article of claim 33 wherein the process includes the further step of generating modified source images by cropping the source images captured in said capturing step to square.

35. The article of claim 34 wherein the process includes the further step of, in the case of a captured source image in landscape format, cropping the captured image from center.

36. The article of claim 35 wherein the process includes the further step of, in the case of a captured source image in portrait format, cropping the captured image from above center.

37. The article of claim 34 wherein the process includes the further step of categorizing the captured source images within the database.

38. The article of claim 34 wherein the process includes the further step of storing the captured source images at different levels of resolution.

39. The article of claim 29 wherein the process includes the further step of deselecting the source image with the highest measurement of visual similarity if it is determined that the source image has a higher measurement of visual similarity to another tile region.

40. The article of claim 29 wherein the process includes the further step of specifying at least one source image for assured inclusion in the mosaic image, the assured source image being positioned in the mosaic image at a locus corresponding to the locus of the tile region having the highest measure of visual similarity therewith.

41. The article of claim 29 wherein the process includes the further step of specifying a sub-category of source images for exclusive matching with a predetermined portion of the target image.

42. The article of claim 29 wherein said article includes a printout from a digital printer.

43. The article of claim 29 wherein said article includes a photograph.

44. The article of claim 29 wherein said article includes photographic paper.

45. The article of claim 29 wherein said article includes photographic film.

46. A storage medium for use with a computer comprising a substrate for storing at least one mosaic image having an appearance that approximates a target image through use of a plurality of source images, and which mosaic image is generated by a process comprising the steps of:

loading the target image into the computer;
dividing the target image into a plurality of tile regions, each tile region representing a distinct locus of the target image, and
for each tile region:
dividing the tile region into distinct sub-regions;
comparing generally complex source images to the tile region to produce a measurement of visual similarity, said comparing step including comparing each sub-region of the tile region with a corresponding portion of each source image to produce the measurement of visual similarity;
selecting the source image with the highest measurement of visual similarity to represent the tile region; and
positioning the selected source image in the mosaic image at a locus corresponding to the locus of the tile region.

47. The storage medium of claim 46 wherein said substrate includes a floppy disk.

48. The storage medium of claim 46 wherein said substrate includes a compact disc.

49. The storage medium of claim 46 wherein said substrate includes an optical disk.

50. The storage medium of claim 46 wherein said substrate includes a removable hard disk.

51. A storage medium on which a computer program for generating a mosaic image is stored, the mosaic image to have an appearance that approximates a target image by utilizing a plurality of source images, the computer program being operative to perform a method comprising the steps of:

loading the target image into a computer;
dividing the target image into a plurality of tile regions, each tile region representing a distinct locus of the target image, and
for each tile region:
dividing the tile region into distinct sub-regions;
comparing generally complex source images to the tile region to produce a measurement of visual similarity, said comparing step including comparing each sub-region of the tile region with a corresponding portion of each source image to produce the measurement of visual similarity;
selecting the source image with the highest measurement of visual similarity to represent the tile region; and
positioning the selected source image in the mosaic image at a locus corresponding to the locus of the tile region.

52. The storage medium of claim 51, wherein the method performed by the computer program further comprises the step of employing source images having one pixel per respective sub-region 53. The storage medium of claim 51, wherein said comparing step includes the further step of computing a form of a Root-Mean Square error of Red, Green and Blue channels.

54. The storage medium of claim 51, wherein the method performed by the computer program further comprises the step of removing source images selected in said selecting step from consideration such that no one source image appears more than once in the mosaic image.

55. The storage medium of claim 51, wherein the method performed by the computer program further comprises the steps of capturing source images, and storing the captured source images in a database.

56. The storage medium of claim 55, wherein the method performed by the computer program further comprises the step of generating modified source images by cropping the source images captured in said capturing step to square.

57. The storage medium of claim 56, wherein the method performed by the computer program further comprises the step of, in the case of a captured source image in landscape format, cropping the captured image from center.

58. The storage medium of claim 57, wherein the method performed by the computer program further comprises the step of, in the case of a captured source image in portrait format, cropping the captured image from above center.

59. The storage medium of claim 56, wherein the method performed by the computer program further comprises the step of categorizing the captured source images within the database.

60. The storage medium of claim 56, wherein the method performed by the computer program further comprises the step of storing the captured source images at different levels of resolution.

61. The storage medium of claim 51, wherein the method performed by the computer program further comprises the step of deselecting the source image with the highest measurement of visual similarity if it is determined that the source image has a higher measurement of visual similarity to another tile region.

62. The storage medium of claim 51, wherein the method performed by the computer program further comprises the step of specifying at least one source image for inclusion in the mosaic image, the assured source image being positioned in the mosaic image at a locus corresponding to the locus of the tile region having the highest measure of visual similarity therewith.

63. The storage medium of claim 51, wherein the method performed by the computer program further comprises the step of specifying a sub-category of source images for exclusive matching with a predetermined portion of the target image.

* * * * *

US006137498C1

(12) EX PARTE REEXAMINATION CERTIFICATE (7706th)
United States Patent
Silvers

(10) Number: US 6,137,498 C1
(45) Certificate Issued: Aug. 31, 2010

(54) DIGITAL COMPOSITION OF A MOSAIC IMAGE

(75) Inventor: Robert S. Silvers, Cambridge, MA (US)

(73) Assignee: Runaway Technology, Inc., Cambridge, MA (US)

Reexamination Request:
No. 90/009,275, Sep. 12, 2008

Reexamination Certificate for:
Patent No.: 6,137,498
Issued: Oct. 24, 2000
Appl. No.: 08/957,833
Filed: Oct. 27, 1997

Related U.S. Application Data

(60) Provisional application No. 60/035,733, filed on Jan. 2, 1997.

(51) Int. Cl.
*G06T 11/00* (2006.01)

(52) U.S. Cl. .................. 345/629; 345/634; 382/284
(58) Field of Classification Search .................. None
See application file for complete search history.

(56) References Cited

U.S. PATENT DOCUMENTS 5,579,471 A 11/1996 Barber et al.

FOREIGN PATENT DOCUMENTS

EP 0852363 A2 7/1998

OTHER PUBLICATIONS

U.S. Appl. No. 60/035,733, filed Jan. 2, 1997.
U.S. Appl. No. 08/957,833, filed Oct. 27, 1997.
U.S. Appl. No. 08/957,833, Declaration of Robert Silvers (Aug. 26, 1998).
U.S. Appl. No. 08/957,833, Supplemental Declaration of Robert S. Silvers in Support of Petition to Make Special (Oct. 28, 1998).
U.S. Appl. No. 08/957,833, Decision of Petition to Make Special (Dec. 20, 1998).
U.S. Appl. No. 08/957,833, Declaration of Robert S. Silvers (Feb. 2, 1999).
U.S. Appl. No. 08/957,833, Supplemental Preliminary Amendment (Feb. 1999).
U.S. Appl. No. 08/957,833, Office Action (May 12, 1999).
U.S. Appl. No. 08/957,833, Request for Reconsideration (Aug. 2, 1999).
U.S. Appl. No. 08/957,833, Office Action (Sep. 9, 1999).
U.S. Appl. No. 08/957,833, Interview Summary (Nov. 16, 1999).
U.S. Appl. No. 08/957,833, Amendment Under 37 C.F.R. §1.116 (Nov. 23, 1999).
U.S. Appl. No. 08/957,833, Notice of Allowability (Feb. 8, 2000).
U.S. Appl. No. 08/957,833, Amendment After Allowance Under 37 C.F.R. §1.312 (Feb. 23, 2000).
U.S. Appl. No. 08/957,833, Response to Rule 312 Communication (2000).
A. Finkelstein, Web Gothic (1995).
Wired Magazine, cover and p. 18, vol. 3.11 (Nov. 1995).
R.N. Centella, Gioconda Sapiens (1995).
R. Silvers, Portrait of Jerome Weisner, Frames [MIT Media Lab Newsletter] (1995).

(Continued)

*Primary Examiner*—Christopher E Lee

(57) ABSTRACT

A mosaic image is formed from a database of source images. More particularly, the source images are analyzed, selected and organized to produce the mosaic image. A target image is divided into tile regions, each of which is compared with individual source image portions to determine the best available matching source image by computing red, green and blue channel root-mean square error. The mosaic image is formed by positioning the respective best-matching source images at the respective tile regions.

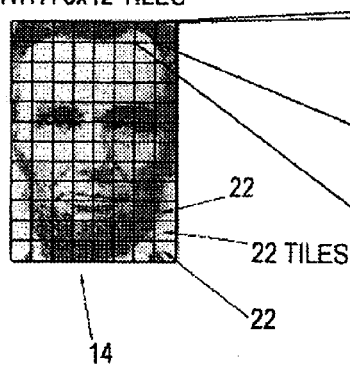

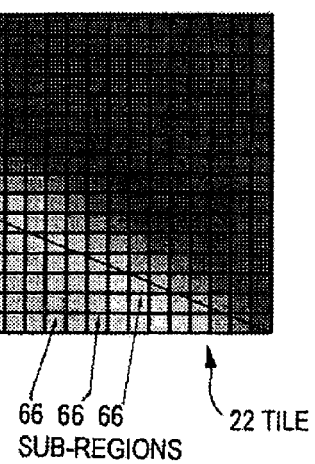

OTHER PUBLICATIONS

R.S. Gray, "Content–based Image Retrieval: Color and Edges", Dartmouth Computer Science Technical Report PCS–TR95–252 (1995).

M. Stricker & A. Dimai, "Color Indexing with Weak Spatial Constraints", Storage & Retrieval for Still Image & Video Databases IV, Proc. of SPIE vol. 2670, pp. 29–40 (Feb. 1996).

H. Lu et al., "Efficient Image Retrieval By Color Contents", in Applications of Databases, First Int'l Conf. on Applications of Databases, pp. 95–108 (1994).

W. Hsu et al., "An Integrated Color–Spatial Approach to Content–based Image Retrieval," Proc. fo the 3rd ACM Int'l Conf. on Multimedia, pp. 305–313 (1995).

M. Ioka, "A Method of Defining the Similarlity of Images on the Basis of Color Information," IBM Research Report RT–0030, Tokyo Research Lab. (1989).

R. White, "How Computers Work", pp. 49–51, 63, 67, 75, 79 (1993).

Brochure, Adobe Photoshop 3.0 (Aug. 1995).

V. Ogle & M. Stonebraker, "Chabot: Retrieval from a Relational Database of Images," Computer, pp. 40–48 (Sep. 1995).

W. Niblack & M. Flickner, "Find Me the Pictures That Look Like This: IBM's Image Query Project", Advanced Imaging, pp. 32–35 (Apr. 1993).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14, 29, 46 and 51 are determined to be patentable as amended.

Claims 2-10, 15-25, 30-45, 47-50 and 52-60, dependent on an amended claim, are determined to be patentable.

Claims 11-13, 26-28 and 61-63 were not reexamined.

1. A method for generating a mosaic image with an appearance that approximates a target image by utilizing a plurality of source images and a computer, comprising the steps of:
   loading the target image into the computer;
   dividing the target image into a plurality of tile regions, each tile region representing a distinct locus of the target image, and
   for each tile region:
   dividing the tile region into distinct sub-regions;
   comparing generally complex source images to the tile region to produce a measurement of visual similarity, said comparing step including comparing each sub-region of the tile region with a corresponding portion of each source image to *provide shape matching in order to* produce the measurement of visual similarity;
   selecting the source image with the highest measurement of visual similarity to represent the tile region; and
   positioning the selected source image in the mosaic image at a locus corresponding to the locus of the tile region.

14. An Apparatus for generating a mosaic image with an appearance that approximates a target image by utilizing a plurality of source images, comprising:
   A computer workstation that executes mosaic generation software being operative to divide the target image into a plurality of tile regions, each tile region representing a distinct locus of the target images;
   said mosaic generation software being further operative to operate upon each tile region to:
   divide the tile region into distinct sub-regions;
   compare a plurality of generally complex source image portions to the tile region to produce a measurement of visual similarity, the comparing including comparing each sub-region of the tile region with a corresponding portion of each source image to *provide shape matching in order to* produce the measurement of visual similarity;
   select the source image with the highest measurement of visual similarity to represent the tile region; and
   position the selected source image in the mosaic image at a locus corresponding to the locus of the tile region.

29. An article comprising a substrate having a mosaic image thereupon, said mosaic image having an appearance that approximates a target image through use of a plurality of source images, and which mosaic image is generated by a process executed with a computer comprising the steps of:
   loading the target image into the computer;
   dividing the target image into a plurality of tile regions, each tile region representing a distinct locus of the target image, and
   for each tile region:
   dividing the tile region into distinct sub-regions;
   comparing generally complex source images to the tile region to produce a measurement of visual similarity, said comparing step including comparing each sub-region of the tile region with a corresponding portion of each source image to *provide shape matching in order to* produce the measurement of visual similarity;
   selecting the source image with the highest measurement of visual similarity to represent the tile region; and
   positioning the selected source image in the mosaic image at a locus corresponding to the locus of the tile region.

46. A storage medium for use with a computer comprising a substrate for storing at least one mosaic image having an appearance that approximates a target image through use of a plurality of source images, and which mosaic image is generated by a process comprising the steps of:
   loading the target image into the computer;
   dividing the target image into a plurality of tile regions, each tile region representing a distinct locus of the target image, and
   for each tile region:
   dividing the tile region into distinct sub-regions;
   comparing generally complex source images to the tile region to produce a measurement of visual similarity, said comparing step including comparing each sub-region of the tile region with a corresponding portion of each source image to *provide shape matching in order to* produce the measurement of visual similarity;
   selecting the source image with the highest measurement of visual similarity to represent the tile region; and
   positioning the selected source image in the mosaic image at a locus corresponding to the locus of the tile region.

51. A storage medium on which a computer program for generating a mosaic image is stored, the mosaic image to have an appearance that approximates a target image by utilizing a plurality of source images, the computer program being operative to perform a method comprising the steps of:
   loading the target image into a computer;
   dividing the target image into a plurality of tile regions, each tile region representing a distinct locus of the target image, and
   for each tile region:
   dividing the tile region into distinct sub-regions;
   comparing complex source images to the tile region to produce a measurement of visual similarity, said comparing step including comparing each sub-region of the tile region with a corresponding portion of each source image to *provide shape matching in order to* produce the measurement of visual similarity;
   selecting the source image with the highest measurement of visual similarity to represent the tile region; and
   positioning the selected source image in the mosaic image at a locus corresponding to the locus of the tile region.

\* \* \* \* \*